US012808392B2

(12) United States Patent
Ishibashi et al.

(10) Patent No.: US 12,808,392 B2
(45) Date of Patent: Nov. 24, 2026

(54) FLUID PRESSURE CONTROL DEVICE

(71) Applicant: KYB Corporation, Tokyo (JP)

(72) Inventors: Koki Ishibashi, Nagano (JP); Nobuyoshi Yoshida, Nagano (JP)

(73) Assignee: KYB Corporation, Tokyo (JP)

(*) Notice: Subject to any disclaimer, the term of this patent is extended or adjusted under 35 U.S.C. 154(b) by 0 days.

(21) Appl. No.: 19/112,716

(22) PCT Filed: Oct. 2, 2023

(86) PCT No.: PCT/JP2023/035894
§ 371 (c)(1),
(2) Date: Mar. 18, 2025

(87) PCT Pub. No.: WO2024/075658
PCT Pub. Date: Apr. 11, 2024

(65) Prior Publication Data

US 2026/0099162 A1 Apr. 9, 2026

(30) Foreign Application Priority Data

Oct. 4, 2022 (JP) ................................ 2022-160028

(51) Int. Cl.
*F15B 13/04* (2006.01)
*F15B 13/02* (2006.01)
*F16K 11/07* (2006.01)

(52) U.S. Cl.
CPC ........ *F15B 13/0402* (2013.01); *F15B 13/024* (2013.01); *F16K 11/07* (2013.01)

(58) Field of Classification Search
CPC .... F16K 11/07; F15B 13/021; F15B 13/0412; F15B 13/024; F15B 13/0402; F25B 2201/51
USPC .......................................................... 91/447
See application file for complete search history.

(56) References Cited

U.S. PATENT DOCUMENTS 6,612,332 B2 9/2003 Miyazoe et al.
8,613,292 B2 * 12/2013 Miyazoe .............. F15B 11/064 137/596.14
10,180,149 B2 * 1/2019 Mizukami ........... F15B 13/0402
10,323,762 B2 * 6/2019 Janecke .................. F16K 17/22
11,506,297 B2 * 11/2022 Sorokin .............. F15B 13/0402
2016/0004258 A1 1/2016 Nalgirkar et al.

FOREIGN PATENT DOCUMENTS

JP 2003-202003 A 7/2003

* cited by examiner

*Primary Examiner* — Hailey K. Do
(74) *Attorney, Agent, or Firm* — Rabin & Berdo, P.C.

(57) ABSTRACT

A fluid pressure control device includes a main valve block and a sub-valve block attached to the main valve block. The main valve block includes: an actuator passage through which the working fluid supplied to and discharged from the actuator flows; a valve body configured to switch a supply and discharge direction of the working fluid; a first pressure detection passage in communication with the actuator passage. The sub-valve block has a second pressure detection passage in communication with the first pressure detection passage and a pressure detection port in communication with the second pressure detection passage and to which a pressure sensor is attached.

1 Claim, 1 Drawing Sheet

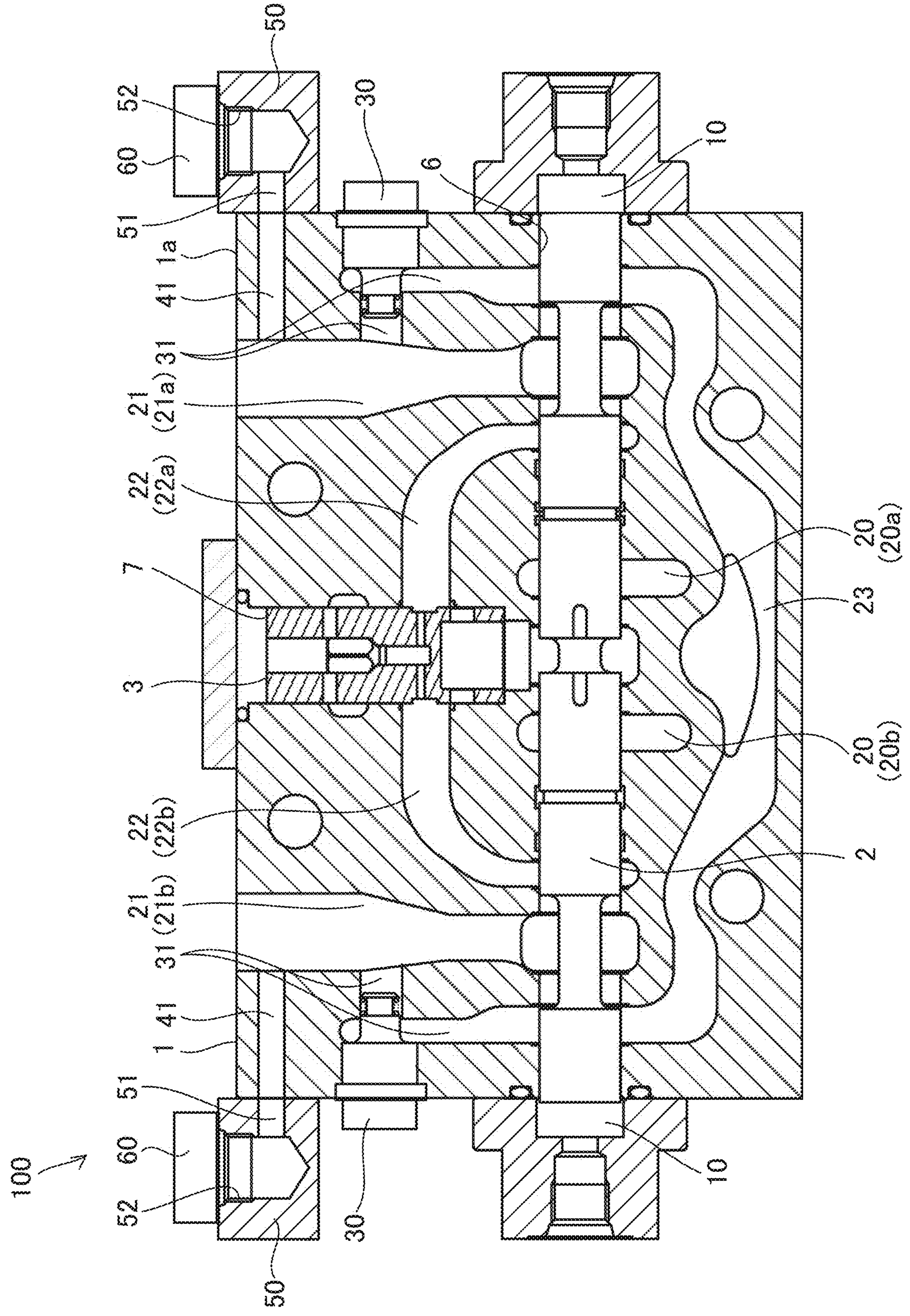
50
52
60
51
1a
41
31
21
(21a)
22
(22a)
7
3
22
(22b)
21
(21b)
31
1
41
51
60
52
50
100
30
6
10
20
(20a)
23
20
(20b)
2
30
10

FLUID PRESSURE CONTROL DEVICE

TECHNICAL FIELD

The present invention relates to a fluid pressure control device.

BACKGROUND ART

JP2003-202003A discloses a switching valve device that supplies and discharges pressure oil to and from an arm cylinder. In the switching valve device, a block-shaped main body is formed with supply and discharge passages, and the pressure oil is supplied to and discharged from a cylinder by a pump through the supply and discharge passages. The main body includes a spool, and as the spool is moved by the pilot pressure along the axial direction, the direction of supply and discharge of the pressure oil to and from the cylinder is switched. In addition, a relief valve is provided in the supply and discharge passages.

SUMMARY OF INVENTION

In the switching valve device as described in JP2003-202003A, it is generally carried out to detect the pressure of a working fluid that is supplied to and discharged from the cylinder, in order to control the operation of the cylinder. To detect the pressure of the working fluid, it is conceivable to guide the working fluid from the supply and discharge passage to a port for pressure detection and to attach a sensor, etc. to the port. However, in the switching valve device described in JP2003-202003A, because the relief valve is provided in a vicinity of the supply and discharge passage, there is insufficient space to form the port for pressure detection in the main body. Therefore, if an attempt is made to secure a space for forming the port for pressure detection in the main body, the size of the main body needs to be increased, and consequently, the entire size of the switching valve device also needs to be increased.

An object of the present invention is to enable detection of a pressure of a working fluid supplied to and discharged from an actuator while suppressing an increase in the size of a main valve block in a fluid pressure control device.

According to one aspect of the present invention, a fluid pressure control device for controlling an actuator driven by a working fluid discharged by a pump is provided. The fluid pressure control device includes a main valve block, and a sub-valve block attached to the main valve block. The main valve block has: an actuator passage through which the working fluid supplied to and discharged from the actuator flows; a valve body configured to switch a supply and discharge direction of the working fluid supplied to and discharged from the actuator through the actuator passage; and a first pressure detection passage in communication with the actuator passage. The sub-valve block has a second pressure detection passage in communication with the first pressure detection passage, and a pressure detection port in communication with the second pressure detection passage and to which a pressure detector is attached.

BRIEF DESCRIPTION OF DRAWINGS

FIG. 1 is a sectional view showing a fluid pressure control device according to an embodiment of the present invention.

DESCRIPTION OF EMBODIMENTS

A fluid pressure control device 100 according to an embodiment of the present invention will be described with reference to the drawings.

The fluid pressure control device 100 is a device for controlling an actuator (not shown) that is driven by a working fluid discharged from a pump (not shown), and it is mounted on, for example, working machines such as construction machinery, agricultural machinery, industrial machinery, and so forth. In the following, a description will be given of a case in which the fluid pressure control device 100 is mounted on a hydraulic excavator and used to control the operation of the actuators such as a hydraulic motor for travelling, and a hydraulic cylinders for driving a boom, an arm, a bucket, and so forth. Note that, although explanation will be made regarding an example in which working oil is used as the working fluid for driving the actuator of the hydraulic excavator, other fluids such as working water, etc. may also be used as the working fluid.

The fluid pressure control device 100 includes a main valve block 1 and sub-valve blocks 50 that are attached to the main valve block 1.

The main valve block 1 has a main spool 2 serving as a valve body that switches the supply and discharge direction of the working oil, a sub-spool 3 that is moved in the direction perpendicular to the axial direction of the main spool 2, a main accommodation hole 6 that slidably accommodates the main spool 2, and a sub-accommodation hole 7 that slidably accommodates the sub-spool 3.

The main accommodation hole 6 is formed so as to penetrate through the main valve block 1. Pilot pressure chambers 10 are respectively provided at two opening portions of the main accommodation hole 6 in the main valve block 1. In the fluid pressure control device 100, the supply and discharge direction of the working oil for the actuator is switched when a pilot pressure is guided to the pilot pressure chambers 10 by operation of a lever, etc. (not shown) and as the main spool 2 is moved along the axial direction by the pilot pressure. Springs (not shown) are respectively provided in the pilot pressure chambers 10, and the main spool 2 is biased towards a neutral position by the springs. The sub-accommodation hole 7 is formed so as to communicate with the main accommodation hole 6 and to extend in the direction perpendicular to the main accommodation hole 6. The sub-spool 3 switches respective communications between supply ports 20 and lead-out passages 22, which will be described later.

The main valve block 1 has: the supply ports 20 to which the working oil, which has been discharged from the pump, is supplied; actuator passages 21 through which the working oil, which is to be supplied to and discharged from the actuator, flows; the lead-out passages 22 that guide the working oil supplied from the supply ports 20 to the actuator passages 21; and a discharge passage 23 that communicates with a tank (not shown). In this embodiment, the supply ports 20, the actuator passages 21, and the lead-out passages 22 are formed in pairs across the sub-accommodation hole 7, and each communicates with the main accommodation hole 6. In addition, the lead-out passages 22 also communicate with the sub-accommodation hole 7.

These passages formed in the main valve block 1 are arranged substantially symmetrically on the left and right with respect to the sub-accommodation hole 7, and in the following, those arranged on the right side of the sub-accommodation hole 7 in FIG. 1 are also referred to as a first supply port 20*a*, a first actuator passage 21*a*, and a first lead-out passage 22*a* in a respective manner, and those arranged on the left side of the sub-accommodation hole 7 in FIG. 1 are also referred to as a second supply port 20*b*, a second actuator passage 21*b*, and a second lead-out passage 22*b* in a respective manner.

The supply ports 20 are connected to the pump, and the working oil is supplied to the supply ports 20 from the pump. The actuator passages 21 are connected to piping (not shown) of the actuator, and the working oil is supplied to and discharged from the actuator through the actuator passages 21. The discharge passage 23 can be connected to the actuator passages 21 and guides the working oil discharged from the actuator to the tank through the actuator passages 21. The discharge passage 23 is provided on the opposite side of the actuator passages 21 across the main spool 2.

The main spool 2 is a valve body that is formed to control the communication between the supply ports 20 and the sub-accommodation hole 7, the respective communications between the lead-out passages 22 and the actuator passages 21, and the communication between the actuator passages 21 and the discharge passage 23. Specifically, as shown in FIG. 1, in a state in which the pilot pressure is not guided to any of the pilot pressure chambers 10, all of the communication between the supply ports 20 and the sub-accommodation hole 7, the respective communications between the lead-out passages 22 and the actuator passages 21, and the communication between the actuator passages 21 and the discharge passage 23 are shut off by the main spool 2. Note that, in a state shown in FIG. 1, the respective communications between the supply ports 20 and the lead-out passages 22 are also shut off by the sub-spool 3.

In contrast, when the pilot pressure is guided to the pilot pressure chamber 10 on the left side in FIG. 1 and the main spool 2 slides to the right side from the state shown in FIG. 1, the first supply port 20*a* is communicated with the sub-accommodation hole 7, and the second lead-out passage 22*b* is communicated with the second actuator passage 21*b*. In addition, the sub-spool 3 is opened by the pressure of the working oil guided from the first supply port 20*a* to the sub-accommodation hole 7, and the working oil is guided from the first supply port 20*a* to the second lead-out passage 22*b*. Thus, the working oil from the first supply port 20*a* is supplied to the actuator through the sub-accommodation hole 7, the second lead-out passage 22*b*, and the second actuator passage 21*b*. On the other hand, the first actuator passage 21*a* is communicated with the discharge passage 23, and thereby, the working oil is discharged from the actuator to the tank through the first actuator passage 21*a* and the discharge passage 23.

In addition, when the pilot pressure is guided to the pilot pressure chamber 10 on the right side in FIG. 1 and the main spool 2 slides to the left side the state shown in FIG. 1, the second supply port 20*b* is communicated with the sub-accommodation hole 7, and the first lead-out passage 22*a* is communicated with the first actuator passage 21*a*. In addition, the sub-spool 3 is opened by the pressure of the working oil guided from the second supply port 20*b* to the sub-accommodation hole 7, the working oil is guided from the second supply port 20*b* to the first lead-out passage 22*a*. Thus, the working oil from the second supply port 20*b* is supplied to the actuator through the sub-accommodation hole 7, the first lead-out passage 22*a*, and the first actuator passage 21*a*. On the other hand, the second actuator passage 21*b* is communicated with the discharge passage 23, and thereby, the working oil is discharged from the actuator to the tank through the second actuator passage 21*b* and the discharge passage 23. As described above, the main spool 2 switches the supply and discharge direction of the working oil supplied to and discharged from the actuator through the actuator passages 21.

In addition, the main valve block 1 includes relief passages 31 through which the discharge passage 23 and the actuator passages 21 are communicated, relief valves 30 that are respectively provided in the relief passages 31, and first pressure detection passages 41 that respectively communicate with the actuator passages 21.

When the pressure in the actuator passage 21 exceeds the relief pressure of the relief valve 30, which has been set in advance, the relief valve 30 is opened, and the high-pressure working oil is discharged from the actuator passage 21 to the discharge passage 23 through the relief passage 31. As a result, the fluid pressure control device 100 and/or the actuator are/is prevented from being damaged due to high pressure build-up inside the actuator passages 21 and/or inside the actuator.

The first pressure detection passages 41 are each a through hole that is formed to extend linearly such that one end thereof opens at an outer surface of the main valve block 1 and the other end opens in the actuator passage 21, thereby causing the actuator passage 21 to communicate with the outside of the main valve block 1. Specifically, the first pressure detection passage 41 is formed between an outer surface 1*a* of the main valve block 1 at which the actuator passage 21 opens, on one side, and both of the relief passage 31 and the relief valve 30, on the other side. The function of the first pressure detection passages 41 will be described later in conjunction with the description of the sub-valve blocks 50.

Next, the configuration of the sub-valve blocks 50 will be described in detail.

The sub-valve blocks 50 are respectively attached to opening portions of the first pressure detection passages 41 in the main valve block 1 by a fixing member such as a bolt, etc. (not shown). In this embodiment, the sub-valve blocks 50 are respectively attached to the opening portions of two first pressure detection passages 41 that respectively communicate with the actuator passages 21*a* and 21*b*. The sub-valve blocks 50 each has a second pressure detection passage 51 that communicates with the first pressure detection passage 41 and a pressure detection port 52 that communicates with the second pressure detection passage 51 and to which a pressure sensor 60 serving as a pressure detector is attached.

The second pressure detection passage 51 is formed so as to extend coaxially with the first pressure detection passage 41 and so as to have substantially the same diameter as the first pressure detection passage 41. The pressure detection port 52 is formed so as to extend in the direction perpendicular to the second pressure detection passage 51. The pressure detection port 52 is formed to have a larger diameter than both of the first pressure detection passage 41 and the second pressure detection passage 51.

The working oil in the actuator passage 21 is guided to the pressure sensor 60 through the first pressure detection passage 41, the second pressure detection passage 51, and the pressure detection port 52. Therefore, by means of the pressure sensor 60, it becomes possible to detect the pressure of the working oil that is supplied to and discharged from the actuator. As a result, it is possible to control the operation of the actuator by, for example, detecting the pressure of the working oil that is supplied to the actuator by the pressure sensor 60 and by increasing the discharge pressure of the pump when thus-detected pressure is lower than the preset value. Note that, the pressure detection port 52 is not limited to one that is formed so as to extend in the direction perpendicular to the second pressure detection passage 51, and for example, the pressure detection port 52 may be formed to extend coaxially with the second pressure detection passage 51, or the pressure detection port 52 may be formed to extend in parallel with the second pressure detection passage 51 such that the axis of the second pressure detection passage 51 is offset from the axis of the pressure detection port 52.

As described above, if the relief valve 30 is provided in the vicinity of the actuator passage 21, it is difficult to secure a sufficient space to form the pressure detection port 52 having a relatively large diameter in the main valve block 1, and if the space is to be secured in the main valve block 1 for forming the pressure detection port 52, there is a risk in that the size of the main valve block 1 is increased, and as a result, the size of the entire fluid pressure control device 100 is increased.

In contrast, in the fluid pressure control device 100 according to this embodiment, as described above, the sub-valve blocks 50, which are attached to the main valve block 1, are each formed with the pressure detection port 52, and the pressure sensor 60 is attached thereto. Thus, the pressure detection port 52 having a relatively large diameter is not formed in the main valve block 1, and only the first pressure detection passage 41 having a smaller diameter than the pressure detection port 52 is formed. Therefore, even if there is no space to form the pressure detection port 52 in the main valve block 1, it becomes possible to detect the pressure of the working oil supplied to and discharged from the actuator by the pressure sensor 60 without increasing the size of the main valve block 1. In addition, even with an existing valve block, by machining the first pressure detection passage 41 and attaching the sub-valve block 50 and the pressure sensor 60, it becomes possible to detect the pressure of the working oil supplied to and discharged from the actuator.

In addition, in the fluid pressure control device 100, the sub-valve block 50 is attached to the main valve block 1 such that the position of the end surface (the upper end surface in FIG. 1) is located further away from the main spool 2 than the position of the outer surface 1*a* of the main valve block 1 at which the actuator passage 21 opens (the upper end surface in FIG. 1). In other words, the size and the attachment position of the sub-valve block 50 are not restricted by the shape of the main valve block 1. As described above, because the size of the sub-valve block 50 can be set relatively freely, it becomes possible to employ the pressure sensor 60 of various sizes by changing the size of the pressure detection port 52 to be formed in the sub-valve block 50 to any desired size without changing the configuration of the main valve block 1. In addition, by appropriately changing the position of the sub-valve block 50 attached to the main valve block 1 and/or the direction in which the pressure detection port 52 extends, it becomes possible to mount the pressure sensor 60 in any desired orientation with respect to the main valve block 1.

In addition, in the fluid pressure control device 100, the first pressure detection passage 41 is formed between the outer surface 1*a* of the main valve block 1 and both of the relief passage 31 and the relief valve 30. With such a configuration, even if the relief valve 30 is provided in the main valve block 1, it is possible to form the first pressure detection passage 41 without interfering with the relief valve 30. In addition, because the region between the outer surface 1*a* of the main valve block 1 and the relief passage 31 and the relief valve 30 is the region where neither the discharge passage 23 nor the relief passage 31 is formed, there is no need to avoid the discharge passage 23 and/or the relief passage 31 when the first pressure detection passage 41 is to be formed, and so, it is possible to increase a degree of freedom in forming the oil passage of the first pressure detection passage 41.

Note that, the first pressure detection passage 41 and the sub-valve block 50 may be provided for only one of the actuator passages 21*a* and 21*b*. In addition, the configuration of the main valve block 1 is not limited to the configurations described above, and it suffices that the main valve block 1 has a configuration at least having: single actuator passage 21 through which the working oil that is supplied to and discharged from the actuator flows; the main spool 2 that switches the supply and discharge direction of the working oil supplied to and discharged from the actuator through the actuator passage 21; and the first pressure detection passage 41 that communicates with the actuator passage 21.

According to the above-described embodiment, the following operational advantages are achieved.

In the fluid pressure control device 100, the sub-valve block 50, which is attached to the main valve block 1, is formed with the pressure detection port 52, and the pressure sensor 60 is attached thereto. Thus, in the main valve block 1, the pressure detection port 52 is not formed, and only the first pressure detection passage 41 is formed. Therefore, even if there is no space to form the pressure detection port 52 in the main valve block 1, it is possible to detect the pressure of the working oil supplied to and discharged from the actuator by the pressure sensor 60 without increasing the size of the main valve block 1.

In the fluid pressure control device 100, even if the relief valve 30 is provided in the main valve block 1, it is possible to form the first pressure detection passage 41 without interfering with the relief valve 30. In addition, because the first pressure detection passage 41 is formed in the region in the main valve block 1 where the relief passage 31 is not formed, it is possible to increase a degree of freedom in forming the oil passage.

The configurations, operations, and effects of the embodiment of the present invention configured as described above will be collectively described.

The fluid pressure control device 100 controls the actuator driven by the working fluid discharged by the pump. The fluid pressure control device 100 includes the main valve block 1 and the sub-valve block 50 attached to the main valve block 1. The main valve block 1 has: the actuator passage 21 through which the working fluid supplied to and discharged from the actuator flows; the main spool 2 serving as the valve body configured to switch the supply and discharge direction of the working fluid supplied to and discharged from the actuator through the actuator passage 21; and the first pressure detection passage 41 in communication with the actuator passage 21. The sub-valve block 50 has the second pressure detection passage 51 in communication with the first pressure detection passage 41 and the pressure detection port 52 in communication with the second pressure detection passage 51 and to which the pressure sensor 60 serving as the pressure detector is attached.

With this configuration, the sub-valve block 50, which is attached to the main valve block 1, is formed with the pressure detection port 52 and the pressure sensor 60 is attached to the pressure detection port 52. Thus, in the main valve block 1, the pressure detection port 52 is not formed, and only the first pressure detection passage 41 is formed. Therefore, even if there is no space to form the pressure detection port 52 in the main valve block 1, it is possible to detect the pressure of the working oil supplied to and discharged from the actuator by the pressure sensor 60 without increasing the size of the main valve block 1.

In addition, the main valve block 1 further has: the discharge passage 23 provided on the opposite side of the actuator passage 21 across the main spool 2, the discharge passage 23 being in communication with the tank; the relief passage 31 through which the discharge passage 23 and the actuator passage 21 are communicated; and the relief valve 30 provided in the relief passage 31. The first pressure detection passage 41 is formed between the outer surface 1*a* of the main valve block 1 at which the actuator passage 21 opens and both of the relief passage 31 and the relief valve 30.

With this configuration, even if the relief valve 30 is provided in the main valve block 1, it is possible to form the first pressure detection passage 41 without interfering with the relief valve 30. In addition, because the first pressure detection passage 41 is formed in the region in the main valve block 1 where the discharge passage 23 and/or the relief passage 31 are/is not formed, it is possible to increase a degree of freedom in forming the oil passage.

Embodiments of the present invention were described above, but the above embodiments are merely examples of applications of the present invention, and the technical scope of the present invention is not limited to the specific constitutions of the above embodiments.

With respect to the above description, the contents of application No. 2022-160028, with a filing date of Oct. 4, 2022, in Japan, are incorporated herein by reference.

The invention claimed is:

1. A fluid pressure control device for controlling an actuator driven by a working fluid discharged by a pump, the fluid pressure control device comprising:

a main valve block, and a sub-valve block attached to the main valve block, wherein the main valve block has:

an actuator passage through which the working fluid is supplied to and discharged from the actuator flows, a valve body configured to switch a supply and discharge direction of the working fluid supplied to and discharged from the actuator through the actuator passage, a first pressure detection passage in communication with the actuator passage, a discharge passage provided on an opposite side of the actuator passage across the valve body, the discharge passage being in communication with a tank, a relief passage through which the discharge passage and the actuator passage are communicated, and a relief valve provided in the relief passage, wherein the first pressure detection passage is formed between an outer surface of the main valve block at which the actuator passage opens and both of the relief passage and the relief valve; and the sub-valve block has a second pressure detection passage in communication with the first pressure detection passage, and a pressure detection port in communication with the second pressure detection passage and to which a pressure detector is attached.

* * * * *